United States Patent [19]

Dixon

[11] Patent Number: 4,555,005
[45] Date of Patent: Nov. 26, 1985

[54] FRICTION CLUTCHES

[75] Inventor: Alan G. Dixon, Wellesbourne, England

[73] Assignee: Automotive Products plc, Leamington Spa, England

[21] Appl. No.: 571,725

[22] Filed: Jan. 18, 1984

[30] Foreign Application Priority Data

Jan. 19, 1983 [GB] United Kingdom ............... 8301425

[51] Int. Cl.$^4$ ............................................. F16D 13/50
[52] U.S. Cl. ................................. 192/70.27; 192/89 B
[58] Field of Search .................. 192/89 B, 70.11, 70.27, 192/70.28; 180/53.1

[56] References Cited

U.S. PATENT DOCUMENTS 2,813,607  11/1967  Haussermann ..................... 192/89 B
3,978,955  9/1976  Nagano ............................. 192/89 B

FOREIGN PATENT DOCUMENTS 1320488  6/1973  United Kingdom .
1347485  2/1974  United Kingdom .
1452217  10/1976  United Kingdom .

Primary Examiner—Stephen F. Husar
Attorney, Agent, or Firm—Kemon & Estabrook

[57] ABSTRACT

The invention is concerned with provision of a power take-off from a friction clutch without altering the fundamental design of the clutch itself. The clutch comprises a cover member, a pressure plate and a diaphragm spring having an outer belville portion and inwardly directed fingers. The diaphragm spring urges the pressure plate against driven plate to provide a primary drive. The diaphragm spring is located on the cover member by tabs passing through mounting apertures at roots of the fingers and bent over to hold the spring in position. A power take-off drive member incorporates tabs engaged in the mounting apertures and bent over to locate the power take-off drive member with respect to the cover.

5 Claims, 2 Drawing Figures

FRICTION CLUTCHES

BACKGROUND OF THE INVENTION

The invention relates to diaphragm spring friction clutches and in particular to the provision of secondary drives from such friction clutches.

A typical diaphragm spring clutch comprises a cover member, a pressure plate mounted with respect to the cover member and a diaphragm spring having an outer annular belville portion and inwardly directed fingers disposed between the cover member and the pressure plate. In use the clutch is mounted on a flywheel and a driven plate is interposed between the flywheel and the pressure plate. The diaphragm spring urges the pressure plate into frictional engagement with the driven plate and the driven plate into frictional engagement with the flywheel. In one now well established kind of friction clutch, as described in U.K. Patent Specification No. 1 347 485, the diaphragm spring is located with respect to the cover member by tabs passing through mounting apertures at the roots of the fingers of the diaphragm spring and bent over the hold the diaphragm spring in position.

There is often a requirement, particularly but not exclusively in connection with agricultural and utility vehicles, to provide a secondary drive from the clutch, in addition to the main drive through the driven plate. The secondary drive is normally connected to a hollow shaft, concentric with the driven shaft from the primary drive. It is desirable to be able to connect the clutch cover to the secondary drive shaft by a secondary drive member without altering the design of the cover or other parts of the clutch. This simplifies the provision of a secondary drive for an existing design of clutch. Hitherto, there has been no convenient way of providing a secondary drive from the kind of clutch described in U.K. Patent Specification No. 1 347 485 and an objective of the present invention is to provide such a secondary drive.

SUMMARY OF THE INVENTION

In accordance with the invention there is provided a friction clutch comprising a cover member, a pressure plate mounted with respect to the cover member and a diaphragm spring having an outer annular belville portion and inwardly directed fingers disposed between the cover member and the pressure plate to urge the pressure plate towards and into frictional engagement with a driven plate to provide a primary drive from the clutch through the driven plate, the diaphragm spring being located with respect to the cover member by tabs passing through mounting apertures at the roots of the fingers of the diaphragm spring and bent over to hold the diaphragm spring in position, wherein a secondary drive member for a secondary drive from the clutch incorporates tabs engaged in the mounting apertures and bent over to secure the drive member to the cover.

Preferably the secondary drive member incorporates a generally annular sheet metal pressing and the tabs of the secondary drive member are an integral part of the pressing.

When the clutch is of the kind in which the tabs of the cover engage a fulcrum ring by which the diaphragm spring is located with respect to the cover, it is preferable that the secondary drive member has outward extensions between its tabs which engage said fulcrum ring between said tabs of the cover.

A major part of the auxiliary drive member should preferably be positioned to the same side of the diaphragm spring as the pressure plate and its tabs should extend through the diaphragm spring to the opposite side thereof.

BRIEF DESCRIPTION OF THE DRAWINGS

An embodiment of the invention will now be described by way of example only with reference to the accompanying drawings in which.

DESCRIPTION OF A PREFERRED EMBODIMENT

Figure 1:
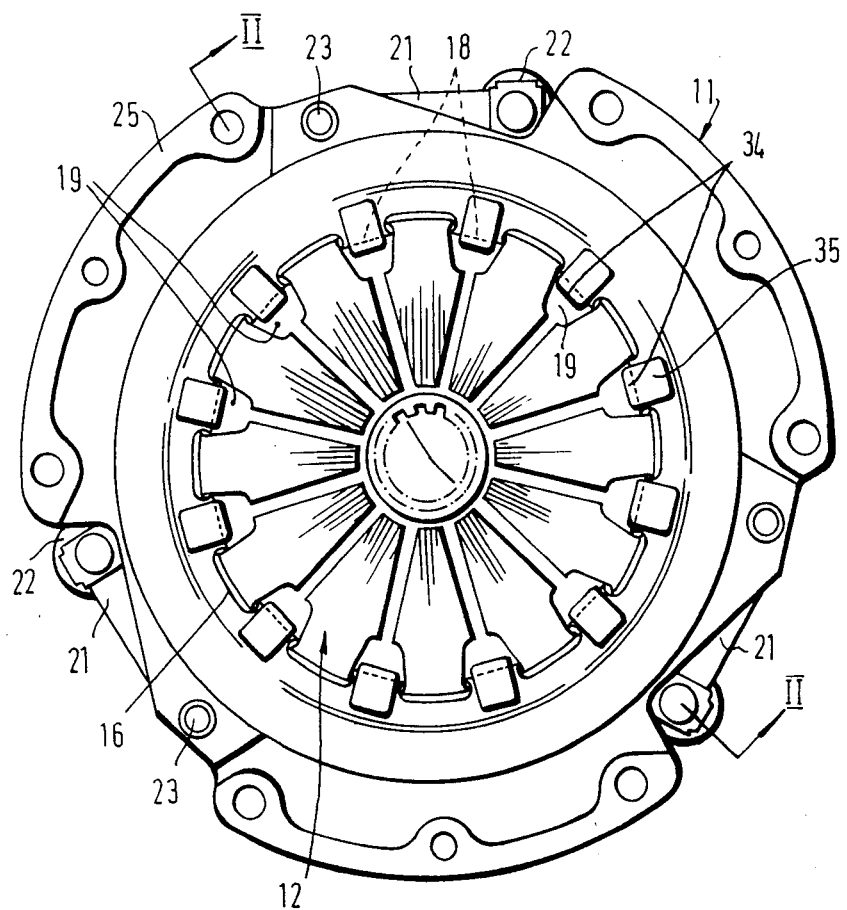
FIG. 1 is an end view of a clutch in accordance with the invention.

The clutch shown in the drawings incorporates a pressed steel cover 11, a diaphragm spring 12 and a pressure plate 13. The diaphragm spring incorporates an outer annular belville portion 14 and inwardly directed fingers 15. The diaphragm spring is pivotally mounted to the cover about an annular fulcrum line coinciding with the roots of the fingers 15 between two annular wire fulcrum rings 16 and 17 which in turn are secured to the cover by a series of tabs 18. These tabs extend through mounting apertures 19 between the roots of adjacent fingers of the diaphragm spring and the outer ends of tabs 18 are bent over the fulcrum ring 18 in an outward direction.

The pressure plate is mounted for rotation with the cover by means of three drive straps 21 which extend between lugs 22 on the pressure plate and mountings 23 on the cover. The drive straps locate the pressure plate co-axially with respect to the cover and provide a circumferential driving connection but allow limited axial movement of the pressure plate with respect to the cover.

Figure 2:
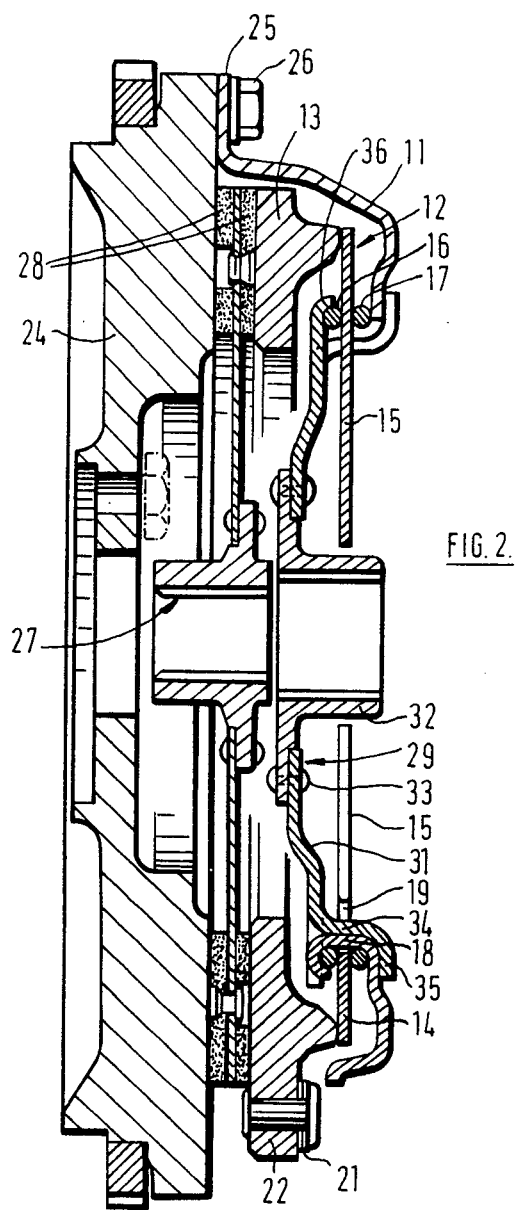
FIG. 2 is a section taken on line II—II of FIG. 1 showing the clutch installed on a flywheel and with a driven plate interposed between the clutch and flywheel.

In FIG. 2, the clutch is shown to be mounted on a flywheel 24 by means of an outer mounting flange 25 of the cover 11 and by bolts 26. A driven plate 27 is interposed between the clutch and the flywheel and has annular friction facings 28 interposed between flat driving faces of the pressure plate 13 and flywheel 24. The frictional engagement between the pressure plate and a friction facing and between the flywheel and the other friction facing caused by the axial force exerted by the diaphragm spring 14 is sufficient to establish a primary drive from the clutch (and the flywheel) to the driven plate 27. This primary drive can be released, or partially released, by deflecting the inner ends of fingers 15 towards the flywheel to relieve the load on the pressure plate exerted by the diaphragm spring.

As thus far described, the clutch and its installation are entirely conventional and are generally in accordance with U.K. Patent Specification No. 1 347 485.

The invention is concerned with the means whereby a secondary drive from the clutch is established. A secondary drive member 29 is constituted primarily by a generally annular steel pressing 31 and a splined hub 32, the two latter components being joined by a series of rivets 33. Hub 32 is intended to engage with and drive a secondary drive shaft, often known as a power takeoff shaft which is a hollow shaft co-axial with a primary driven shaft which is splined to and driven by the hub of driven plate 27. This arrangement of co-axial shafts is common practice and is not shown.

Pressing 31 incorporates a series of twelve tabs 34 which are bent up perpendicular to the general plane of the pressing. Pressing 31 is arranged on the pressure plate side of the diaphragm spring 12 and the tabs 34 are such that they project through corresponding diaphragm spring mounting apertures 19, just inwardly of but in contact with the tabs 18 of the cover 11. The outer ends 35 of tabs 34 are then bent over in an outward direction so that they engage against cover member 11 in the vicinity of the roots of tabs 18. Pressing 31 also incorporates outward extensions 36 between its tabs 35 and these extensions are arranged to seat on fulcrum ring 16. These outward extensions incorporate bent over outer edges to assist this seating.

In this way, the conventional clutch is provided with a secondary or power takeoff drive without any alteration to the fundamental design of the clutch. Drive to the pressing 31 is provided by abutment of the side edges of the cover tabs 18 with the side edges of the extensions 36.

I claim:

1. A friction clutch comprising a cover member, a pressure plate, mounting means mounting the pressure plate with respect to the cover member for axial movement relative thereto, a diaphragm spring having an outer annular belville portion, inwardly directed fingers and mounting apertures defined between adjacent fingers at roots thereof, the diaphragm spring being disposed between the cover member and the pressure plate so as to urge the pressure plate in a direction away from the cover member towards and into frictional engagement with a driven plate to provide a primary drive from the clutch through the driven plate, tabs for locating the diaphragm spring with respect to the cover member, said tabs passing through said mounting apertures and having portions thereof bent over to hold the diaphragm spring in position, and a secondary drive member for a secondary drive from the clutch incorporating further tabs engaged in said mounting apertures and having portions bent over to locate said secondary drive member with respect to the cover.

2. A friction clutch as claimed in claim 1 wherein the secondary drive member incorporates a generally annular sheet metal pressing and the tabs of the secondary drive member are an integral part of the pressing.

3. A friction clutch as claimed in claim 1 further comprising a fulcrum ring by which the diaphragm spring is located with respect to the cover wherein the tabs of the cover member engage said fulcrum ring and the secondary drive member has outward extensions between its tabs which engage said fulcrum ring between said tabs of the cover.

4. A friction clutch as claimed in claim 2 further comprising a fulcrum ring by which the diaphragm spring is located with respect to the cover wherein the tabs of the cover member engage said fulcrum ring and the secondary drive member has outward extensions between its tabs which engage said fulcrum ring between said tabs of the cover.

5. A friction clutch as claimed in claim 1 wherein a major part of the auxiliary drive member is to the same side of the diaphragm spring as the pressure plate and its tabs extend through the diaphragm spring to the opposite side thereof.

* * * * *